United States Patent Office 3,577,295
Patented May 4, 1971

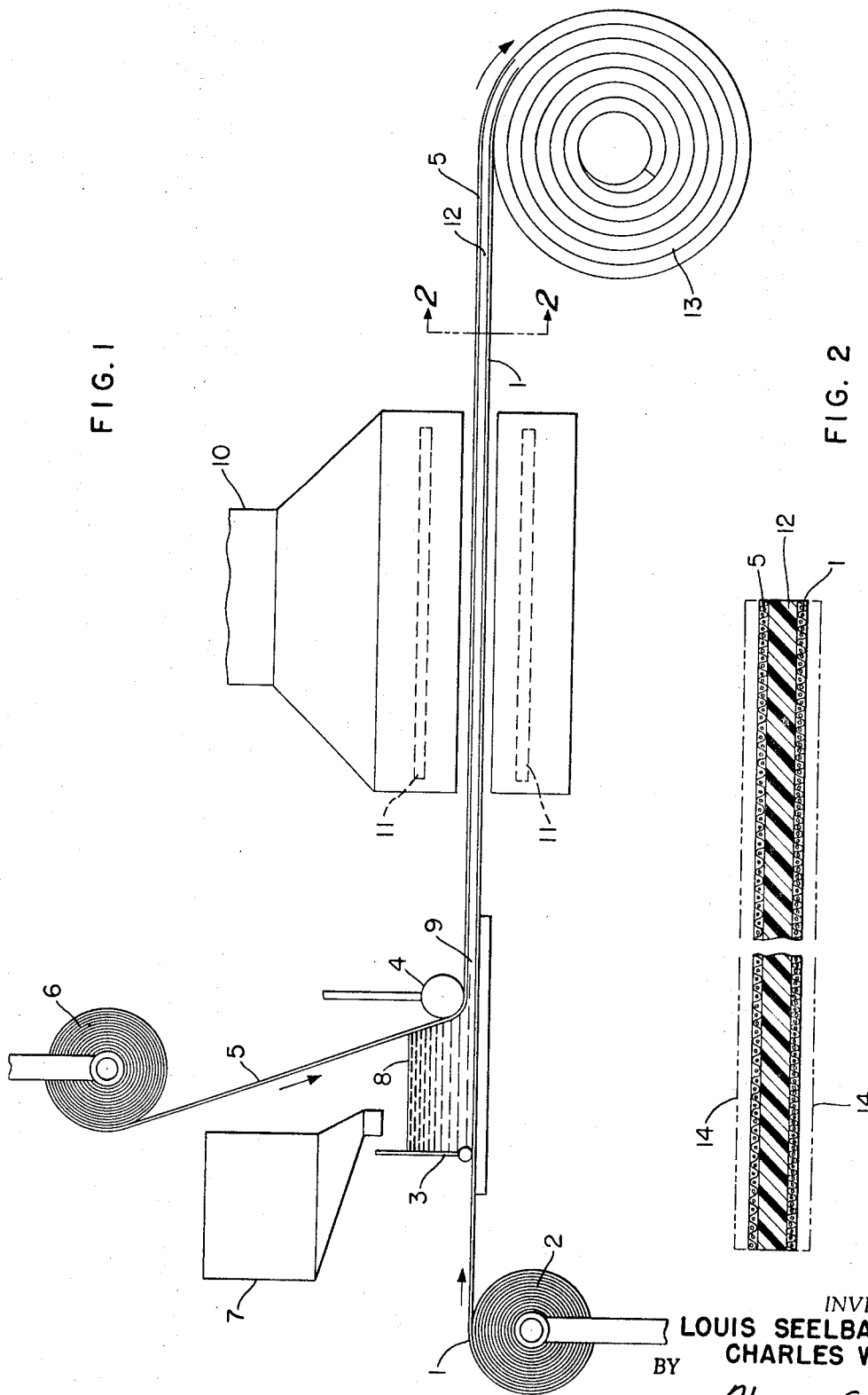

3,577,295
METHOD OF BONDING TEXTILE FABRIC BELTS
Louis Seelbach Kraft, Stow, and Charles W. Quiner, Akron, Ohio, assignors to The Goodyear Tire & Rubber Company, Akron, Ohio
Filed Apr. 10, 1968, Ser. No. 720,099
Int. Cl. B32b 5/00
U.S. Cl. 156—177                    10 Claims

ABSTRACT OF THE DISCLOSURE

A method of preparing a composite structure comprising at least two support layers adhered to at least one layer of a cured polyurethane interposed therebetween which comprises controllably and continuously feeding support layers through a first station having a rear retaining means, a forward control means, and a reservoir of a liquid polyurethane mixture therein, and curing the polyurethane reaction mixture layer thereby superposed between the said layers to form the said composite structure.

---

This invention relates to a method of preparing a composite structure and to the composite structure. More particularly, this invention relates to a method of forming composite structures comprising at least two support members adhered to at least one layer of polyurethane interposed therebetween, such as industrial belts.

Composite structures having multiple layers, particularly those having at least one elastomeric layer interposed between support layers, such as industrial driving and conveyor belts, have been prepared on a continuous basis, for example, by pouring a flowable polyurethane onto a moving support layer, the thickness of the polyurethane on the support being controlled by a doctoring means and then curing the polyurethane to form a cured polyurethane coated support. If the doctoring means were a moving support traveling above the moving support layer, the flowable polyurethane was simply poured onto the support layer and a small bank of the flowable polyurethane was maintained where the two moving supports converged to form a planar nip of a small angle. Such an operation on a commercial basis is directly subject to substantial inefficiencies relating to the maintenance of a constant small bank of the flowable polyurethane in the small angular nip which promotes products having a low quality with deficiencies in their working capabilities.

Thus, it is an object of this invention to provide an improved method of preparing a composite structure comprising at least two support members adhered to at least one layer of a cured polyurethane interposed therebetween.

The advantages and objects of this invention may be more readily understood by reference to the drawings wherein FIG. 1 is a longitudinal elevational view of an industrial belt building apparatus, FIG. 2 is an enlarged cross-sectional view of the industrial belt prepared by the apparatus taken along line 2—2 of FIG. 1.

Reference to the figures shows a square woven nylon duck fabric first support member or layer 1 having a weight of about 15 ounces per square yard and a thickness of about 0.035 inch, being continuously fed from a roll 2 under tension and at a controlled rate of speed beneath a rear gate or retaining means 3 and then substantially horizontally (for example, from about 0 to about plus or minus 10 degrees from horizontal) beneath a forward control guide or forward control means 4. A second support member layer 5, also a square woven nylon duck fabric having a weight of about 15 ounces per square yard and a thickness of about 0.035 inch is fed under substantially the same tension as the first support member 1 from a roll 6 above and at a controlled rate of speed essentially equal to the rate of speed of the first support layer of nylon fabric between the rear gate and forward control guide and beneath the forward control guide so that the second support layer of nylon fabric converges at the forward control guide toward the first support layer at a separation from the first support layer determined by adjusting the distance of the forward control guide from the first support layer. The tension placed on the second support layer from its let-off roll is preferred to be sufficient to keep the second support layer continuously in contact with the forward control guide.

A liquid polyurethane reaction mixture is poured from a hopper 7 and deposited on the first support layer to form a reservoir 8 of the polyurethane reaction mixture between the rear retaining gate and the second support layer. The thickness of the polyurethane reaction mixture 9 between the support layers at the forward control guide is controlled by adjusting the distance of the control guide from the first support layer. It is important and preferred that the level of the reservoir of the liquid polyurethane reaction mixture is higher than the polyurethane reaction mixture between the support layers of the forward control guide. The moving nylon fabric support layers with their polyurethane coat therebetween are fed through a heating stage 10 where heaters 11 heat and cure the liquid polyurethane reaction mixture to form a cured polyurethane layer 12 adhered to and interposed between the first and second nylon fabric support layers. The composite structure which can be used as an industrial belt, is then rolled up on roll 13 at the controlled rate of speed. If an industrial belt having covering layers of polyurethane is desired, it can be constructed by using this method, for example, to yield an integral composite structure shown in FIG. 2 where the industrial belt has outer protective layers of polyurethane 14, shown by the dotted lines, and adhered to and superposed over the nylon support layers 1 and 5 and an inner layer of polyurethane 12 which is interposed between the nylon fabric support layers.

Various materials can be used as the support layers of this invention. Representative of such materials are flexible materials such as elastomers, plastics and fabrics. Representative examples of the elastomeric materials are natural rubber and the various synthetic rubbers such as rubbery polymers of conjugated dienes including polychloroprene, the rubbery copolymers of butadiene and styrene which contain a major proportion of butadiene, particularly copolymers of butadiene and styrene of the hot and cold SBR type which contain from about 60 to about 90 percent by weight of butadiene, copolymers of butadiene and acrylonitrile, butyl rubber, which is a polymerization product of a major proportion of a mono olefin, such as butylene, and a minor portion of multi-olefin, such as butadiene and isoprene, copolymers of ethylene and propylene, terpolymers of ethylene, propylene and a minor proportion of a diene, polyisoprene, polybutadiene, and polymers of alpha olefins such as polyethylene, polypropylene, polybutylene, polyamylene and polyhexylene.

Representative plastics for the support layers are plasticized vinyl resins such as plasticized polyvinyl chloride and plasticized copolymers of vinyl chloride with another vinyl compound such as vinyl chloride-vinyl acetate copolymers, vinyl chloride-vinyl ether copolymers, vinyl chloride-maleate or fumarate copolymers and vinyl chloride-vinylidene chloride copolymers.

Various textile fabrics can be used as support layers for this invention. Representative of various fabrics are those produced from various yarns and those produced from continuous filaments by processes known in the art. Fabrics prepared from polyamides such as nylon, from polyesters, from cellulose and cellulose derivatives such as cotton and rayon, from wire and from glass are particularly useful. Fabrics having various weights can be used such as those having weights of from less than about 0.5 to about 35 ounces per square yard or higher.

In the practice of this invention, an outer surface of a support layer can also be coated with a polyurethane reaction mixture and the said reaction mixture cured to form a polyurethane layer adhered to and superposed over an outer surface of a support layer.

The cured polyurethane layers interposed between the support layers and also such polyurethane layers superposed over the outer surfaces of the support layers, if desired, can have various thicknesses such as from as low as 0.005 inch or thinner and up to 0.8 inch or thicker, depending largely upon the polyurethane used, the composition and thickness of the support layers used, and the intended use for the composite structure.

The polyurethane reaction mixtures used in this invention to prepare the cured polyurethane layers are liquid mixtures commonly used to prepare flexible polyurethanes by the well-known one-shot, prepolymer or semi-prepolymer techniques.

Generally, the polyurethane reaction mixtures are prepared from at least one reactive hydrogen containing polymeric material as determined by the Zerewitinoff method, at least one organic polyisocyanate and a curative. It is to be understood that the polyurethanes referred to in this specification may also contain polyurea linkages. A solvent can be used with the reaction mixture to facilitate its use in the form of a fluid mixture or solution although it is preferred to use the reaction mixture with only a minor amount of solvent, if any. If solvent is used, it can be added to form a mixture containing from about 40 to about 95 percent solids. However, a higher or lower concentration of solids can be used. When the solids concentration is low, the individual applications will deposit a thin layer of the polyurethane polymer, and a large amount of the solvent will have to be removed during the curing process. A solids concentration of 55 percent or higher is generally desired, if a solvent is used.

The reactive hydrogen-containing polymeric material used normally comprises at least one member selected from the group consisting of polyester polyols, polyether polyols, castor oil and hydroxyl terminated polymeric polyols having a molecular weight of from about 2000 to about 4000 and a hydroxyl functionality of from about 2 to about 3. The reactive hydrogen-containing material, generally used, other than the hydroxyl terminated polymeric polyol, has a molecular weight between about 700 and about 5000, and usually between about 1000 and about 3000. (If the molecular weight of the reactive hydrogen-containing material is too low, the polyurethane will not have sufficient elasticity.) Generally, the polyester polyols are the preferred active hydrogen-containing material where high strength and solvent resistance are desired.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid, and azelaic acid. The anhydrides of such acids can be used in place of the acid. If desired, from about one to 20 percent by weight of a triol or higher polyfunctional polyol or polyfunctional acid can be present to produce branching in the polyurethane polymer.

Polyether polyols useful in preparing the polyurethanes of this invention can be prepared by polymerizing or copolymerizing alkylene oxides such as ethylene oxide, propylene oxide, and butylene oxides, by polymerizing or copolymerizing the low-molecular weight glycols, or by the reaction of one or more such alkylene oxides with the glycols or with triol, or with a polycarboxylic acid such as phthalic acid. The polyether polyols include polyalkylenearyl ether glycols or triols, polytetramethylene ether glycols, polyalkylene ether-thioether glycols or triols, and alkyd resins. Generally, the polytetramethylene ether glycols are the preferred polyether glycols.

It is usually preferred that the hydroxyl-terminated polymeric polyol has a molecular weight of from about 2000 to about 4000 and a corresponding hydroxyl number of from about 50 to about 25. The hydroxyl terminated polymeric polyols used in this invention are unsaturated polymers of the type prepared by polymerizing unsaturated monomers comprising from about 70 to about 100 percent conjugated dienes selected from the group consisting of 1,3-butadiene and isoprene and up to about 30 percent styrene with the aid of organic peroxy catalysts to provide polymers which are generally terminated at both ends of their chain with hydroxyl groups and have an hydroxyl functionality of from about 2 to about 3 and usually from about 2.1 to about 2.8. The preferred hydroxyl containing polymeric polyols are polybutadiene polyols, polyisoprene polyols, and butadiene-styrene copolymer polyols having about 80 to 90 percent units derived from butadiene and about 20 to 10 percent units derived from styrene.

The organic polyisocyanates used in this invention include various organic diisocyanates and mixtures thereof. The organic polyisocyanates can be aromatic, aliphatic, or cycloaliphatic or combinations of these types.

Representative examples of such polyisocyanates include the toluene diisocyanates, m-phenylene diisocyanate, 4-chloro-1,3-phenylene diisocyanate, 4,4'-tetramethylene diisocyanate, 1,6 - hexamethylene diisocyanate, 1,10-decamethylene diisocyanate, 1,4-cyclohexylene diisocyanate, 4,4' - methyl - one - bis(cyclohexyl-isocyanate) and 1,5-tetrahydronaphthalene diisocyanate, and mixtures of such diisocyanates. For the purposes of the present invention, the toluene-diisocyanates, diphenylmethane-4,4'-diisocyanate and 3,3' - dimethyl - 4,4' - bisphenylene diisocyanate, are preferred. For convenience, these diisocyanates are referred to as TDI, MDI and TODI, respectively.

Usually the ratio of isocyanate groups of the polyisocyanate, preferably an organic diisocyanate, to the reactive hydrogen-containing groups of the reactive hydrogen-containing polymeric material is from about 1.1/1 to about 12/1 and preferably about 1.2/1 to about 2.5/1. These materials can be reacted at temperatures from about 20° C. to about 150° C., and usually from about 20° C. to about 70° C., to form a polyurethane prepolymer. The reactive hydrogens are supplied by hydroxyl groups. This prepolymer can be dissolved or dispersed in solvent, if desired, to form a solution or dispersion and mixed with a catalyst, chain extending agent, and/or a crosslinking agent to form a polyurethane reaction mixture.

Other methods known to those skilled in the art of preparing polyurethane reaction mixtures with or without solvents being present may also be used.

A catalyst or accelerator can be used to facilitate the reaction which results in substantially reduced set-up time, and thus enhances the thixotropic properties of the polyurethane mixture. Well-known polyurethane catalysts are useful for this purpose such as tertiary amines and the tin salts of fatty acids and also accelerators such as mercaptobenzothiazole.

Agents which promote chain extension and crosslinking of the polymer are also useful and are sometimes known as curing agents which facilitate reacting the polyurethane reaction mixture to set and gel. Diamines, hydrocarbon diols, such as ethylene glycol and propylene glycol, hydroxyl-amines such as triisopropanolamine, are used in this invention as such agents. When these agents are used they are usually added to a polyurethane prepolymer in a ratio of from about 0.5/1 to about 1.5/1 and, preferably, about 0.8/1 to about 1.0/1 amine and/or hydroxyl groups of the chain extending and crosslinking agent for each isocyanate group in excess of the reactive hydrogen groups of the reactive hydrogen-containing polymeric material. Bifunctional materials such as glycols and diamines are generally preferred as chain extending and crosslinking agents. Representative classes of compounds suitable for use as such agents are glycols, diamines having primary or secondary amino groups, dicarboxylic acids, hydroxy amines, hydroxy-carboxylic acids, and aminocarboxylic acids. Representative examples of suitable compounds belonging to these classes are glycols such as ethylene glycol, 1,3-propane-diol, 1,4-butane-diol and glycerol; aliphtic diamines such as ethylene diamine, trimethylene diamine, and tetramethylene diamine; aromatic diamines such as m-phenylene diamine, o- and m-dichlorobenzidine, 2,5-dichlorophenylene diamine, 3,3'-dichloro-4,4'-diamino-diphenyl methane, dianisidine, 4,4'-diamino-diphenyl methane, the naphthylene diamines, tolylene-2,4-diamine, p-aminobenzyl aniline, and o- and p-aminodiphenyl-amine; hydroxy amines such as triethanol amine, 2-amino-ethyl alcohol, 2-amino-1-naphthol and m-aminophenyl; hydroxy carboxylic acids such as glycolic acid and alpha-hydroxy propionic acid; and amino carboxylic acids such as amino acetic acid and amino benzoic acid. The preferred crosslinking agents are butane diol and the chloroamines such as ortho-dichlorobenzidine and methylene bis orthochloroaniline. The latter two chloroamines above are sometimes referred to herein for convenience as ODCB and MOCA, respectively.

Various nonreactive solvents known to those skilled in the polyurethane art can be used for the preparation of the prepolymer solutions and polyurethane reaction mixtures, if a solvent is desired. Representative examples of the solvents are aromatic solvents such as benzene, xylene and toluene; and the liquid lower ketones such as acetone, methyl ethyl ketone, methyl isobutyl ketone, and diisobutyl ketone. If the polyurethane reaction mixtures are to be used to prepare the cured polyurethanes in confined areas which are subject to explosive hazards, nonflammable chlorinated solvents can be used to form nonflammable polyurethane reaction mixtures. Mixtures of solvents may also be used to obtain satisfactory spreading properties and evaporation rates when the polyurethane spray composition is applied to a polymeric surface.

If desired, pigments, surface-active agents, leveling agents, such as cellulose acetate butyrate, and other additives can be added. When a pigment is added, it is added in an amount from about 0.5 to 10 parts and, preferably usually in the amount from about one to two parts of pigment per hundred parts of prepolymer by weight.

The following example further illustrates the invention and is not intended to be limitative. The parts and percentages are by weight unless otherwise indicated.

EXAMPLE I

A steel trough was prepared having an adjustable rear retaining gate, a forward adjustable control guide and side walls. The steel trough had inside dimensions of about 38 inches wide, and about 5 inches between the rear retaining gate and the forward control guide and the side walls of the trough had a height of about 4 inches.

A first support layer of square woven nylon duck fabric having a weight of 15 ounces per square yard, a thickness of about 0.035 inch and a width of 38 inches was continuously fed from a let-off roll under a tension of from about 5 to about 25 pounds per inch of width horizontally through the trough across its bottom beneath the rear retaining gate and then beneath the forward control guide of the trough followed by passing it to a heating unit and then onto a wind-up roll.

A second support layer of the square woven nylon fabric was continuously fed from another let-off roll to the same trough between the rear gate and then beneath the forward guide, passed to the heating unit, and then onto the same wind-up roll. The second support layer was fed from its let-off roll under essentially the same tension and at essentially the same rate of speed as the first nylon fabric support layer so that the first and second support layers converged at the forward control guide to form a planar nip of about 80°. The forward control guide was vertically adjustable so that the distance between the control guide and first nylon support layer could be varied as desired. The tension of the second nylon support layer kept it continuously in contact with the control guide. Thus, although the two support layers converged, they did not actually meet at the forward control guide.

A liquid polyurethane reaction mixture was poured into the trough and deposited on the first support layer to form a reservoir of the polyurethane reaction mixture between the rear retaining gate and the second support layer. The thickness of the polyurethane reaction mixture between the support layers was adjusted to about .04 inch by adjusting the distance between the forward control guide from the first support layer. The adjustable rear gate was adjusted to prevent the polyurethane reaction mixture from flowing out the back of the trough. The level of the reservoir of liquid polyurethane reaction mixture in the trough was maintained above the layer of polyurethane reaction mixture between the support layers under the forward control guide.

The nylon support layers with their layer of polyurethane reaction mixture therebetween were passed to a heating unit at a temperature of about 95° C. for about 15 minutes to cure the polyurethane reaction mixture and then onto a wind-up roll. The prepared composite structure was suitable for use as an industrial belt.

In the practice of this invention the term "planar nip" is used to describe the angle formed between the first and second support layers as they converge toward the forward guide generally exclusive of the curved portion of a support layer as it contacts and conforms to the configuration of the forward guide. This invention is uniquely commercially operatble with a planar nip having an angle of up to at least about 50° to about 170° and preferably up to at least about 70° or more. This feature is particularly advantageous when the first support layer is substantially horizontally fed through the trough or reservoir.

The liquid polyurethane reaction mixture tends to cure even at room temperature until it "sets up" when it flows with difficulty under normal operating conditions. Thus, it is important that the reactants used to prepared the reaction mixture, the rate of speed of the support layers and the thickness of the layer of reaction mixture between the support layers at the forward control guide are adjusted so that the average residence time of the polyurethane reaction mixture in the reservoir is no greater than the set-up time of the said polyurethane reaction mixture.

While certain representative embodiments and details have been shown for the purpose of illustrating the invention, it will be apparent to those skilled in this art that various changes and modifications may be made therein without departing from the spirit or scope of the invention.

What is claimed is:

1. A continuous method of preparing a composite structure comprising at least two textile fabric belt support members having at least one layer of cured polyurethane adhered therebetween which comprises
   (a) continuously feeding a first support member under tension through a first station having a rear retaining means and a forward control means by passing the said first support member beneath the rear retaining means and then beneath the forward control means;
   (b) continuously feeding a second support member under tension at a controlled rate essentially equal to the speed of the first support layer between the rear retaining means and forward control means of the first station and then beneath the forward control means to converge at the forward control means with the first support member at a separation determined by adjusting the distance of the forward control means from the first support member;

(c) depositing a liquid polyurethane reaction mixture in the first station to form a reservoir of the polyurethane reaction mixture on the first support layer between the rear retaining means and the second support layer, and to form a layer of the polyurethane reaction mixture between the support members at the forward control means having a thickness determined by the said separation of the support members, and (d) curing the layer of polyurethane reaction mixture to form the composite structure.

2. A method according to claim 1 wherein the first support layer is fed substantially horizontally beneath the forward control means and where the level of the reservoir of liquid polyurethane reaction mixture is maintained higher than the said layer of polyurethane reaction mixture between the first and second support members at the forward control means.

3. A method according to claim 2 wherein the first and second support layers are fed through the first station under essentially the same tension where the second layer is under sufficient tension to maintain its contact with the forward control means and wherein the first and second support layers form a planar nip of from at least about 50° to about 170°.

4. A method according to claim 3 wherein the forward control means is adjustable and the thickness of the said polyurethane reaction mixture between the first and second support layers at the forward control means is determined by adjusting the distance between the forward control means and the first support layer.

5. A method according to claim 3 where the average residence time of the polyurethane reaction mixture in the said reservoir is no greater than the set-up time of the said polyurethane reaction mixture.

6. A method according to claim 3 where the said polyurethane reaction mixture is prepared from (a) at least one reactive hydrogen-containing polymeric material selected from the group consisting of
 (1) polyhydroxyl polymers having a molecular weight of from about 700 to about 5000 selected from polytetramethylene ether glycols, castor oil, hydroxyl terminated linear polymeric polyesters derived from a glycol and an organic dicarboxylic acid, and
 (2) hydroxyl terminated polymeric polyols having an average molecular weight of from about 2000 to about 4000 and a hydroxyl functionality of from about 2 to about 3, selected from the type prepared by polymerizing unsaturated monomers comprising from about 70 to about 100 percent dienes selected from 1,3-butadiene and isoprene and up to about 30 percent styrene with the aid of a peroxy catalyst;

(b) at least one organic polyisocyanate, the overall molar ratio of the isocyanate groups of the polyisocyanate to the reactive hydrogens of the hydrogen-containing polymeric material being between about 1.1/1 and about 12/1, and (c) a curing agent selected from the group consisting of diamines having primary amino groups, diamines having secondary amino groups, hydrocarbon diols, and hydroxyl amines having primary amino groups, the overall ratio of the amino and hydroxyl groups of the curing agent to the isocyanate groups in excess of the reactive hydrogen groups of the reactive hydrogen-containing polymeric material being from about 0.5/1 to about 1.5/1.

7. A method according to claim 6 wherein the polyisocyanate is selected from the group consisting of the toluene diisocyanates, diphenylmethane-4,4'-diisocyanate and 3,3'-dimethyl-4,4'-bisphenylene diisocyanate, and the curing agent is a diamine selected from the group consisting of ortho-dichlorobenzidine and methylene-bis-orthochloroaniline.

8. A method according to claim 6 wherein mercaptobenzothiazole is added to the polyurethane reaction mixture.

9. A method according to claim 3 wherein the said support layers are comprised of textile fabrices having weights of from about 0.5 to about 35 ounces per square yard.

10. A method according to claim 9 wherein the textile fabric is prepared from fibers selected from the group consisting of nylon, polyesters, cotton and rayon.

References Cited

UNITED STATES PATENTS

| | | | |
|---|---|---|---|
| 3,300,370 | 1/1967 | Epstein et al. | 156—331X |
| 3,332,893 | 7/1967 | Birum et al. | 156—331X |
| 3,377,322 | 4/1968 | Witsiepe | 156—331X |
| 3,391,054 | 7/1968 | Lewis et al. | 156—331X |
| 3,419,533 | 12/1968 | Dieterich | 156—331X |
| 3,428,609 | 2/1969 | Chilvers et al. | 156—331X |
| 3,432,451 | 3/1969 | Kales | 156—331X |
| 3,454,533 | 7/1969 | Kerrigan et al. | 156—331X |
| 3,491,050 | 1/1970 | Keberle et al. | 156—331X |

CARL D. QUARFORTH, Primary Examiner

S. J. LECHERT, Jr., Assistant Examiner

U.S. Cl. X.R.

156—178, 324, 331